Aug. 26, 1924.
S. W. WARMAN
FLEXIBLE NUT
Filed April 7, 1924
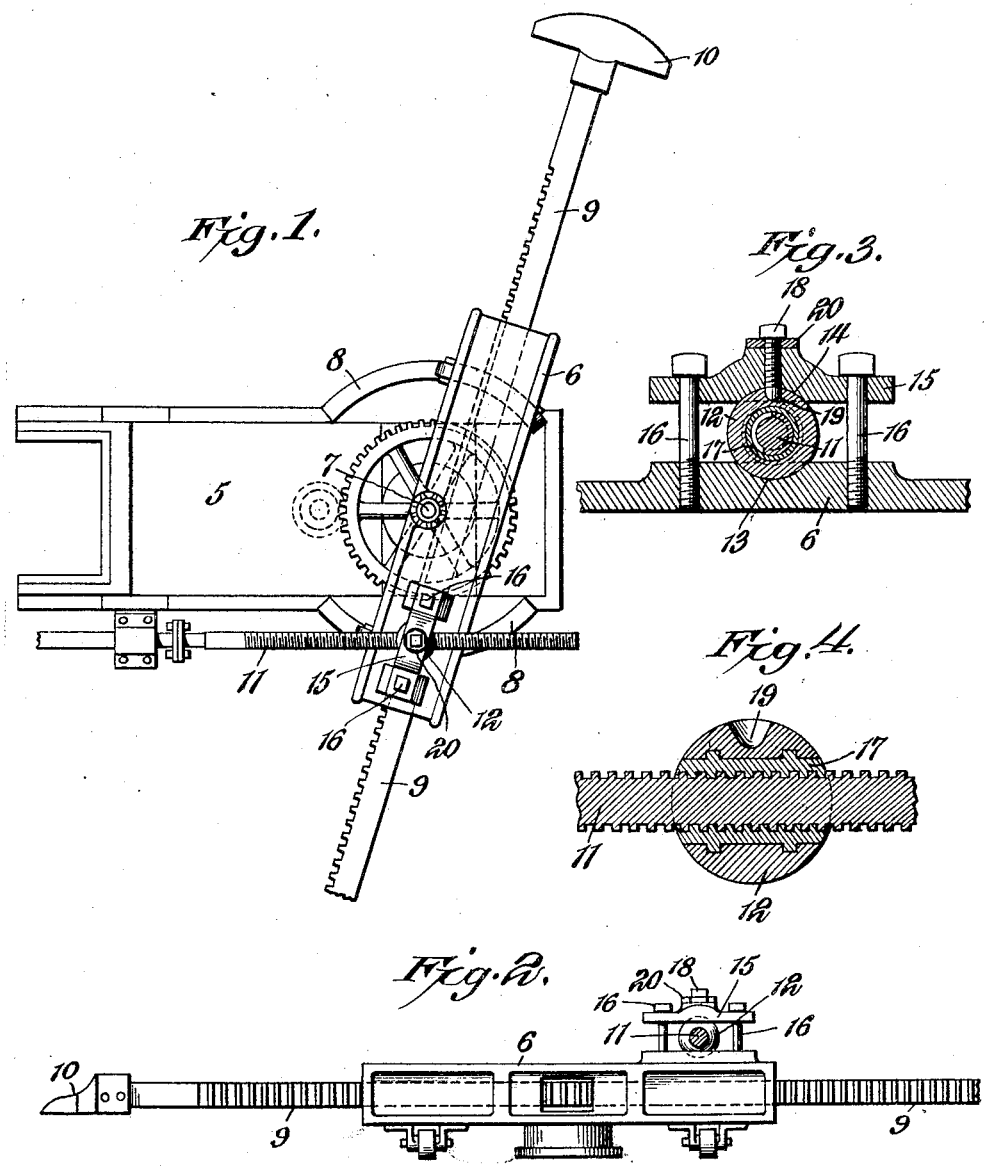
WITNESSES
Howard D. Orr.
E. N. Lovewell
S. W. Warman, INVENTOR,
BY C. G. Siggers.
ATTORNEY Patented Aug. 26, 1924.

1,506,697

UNITED STATES PATENT OFFICE.

SAMUEL W. WARMAN, OF UNIONTOWN, PENNSYLVANIA.

FLEXIBLE NUT.

Application filed April 7, 1924. Serial No. 704,896.

*To all whom it may concern:*

Be it known that I, SAMUEL W. WARMAN, a citizen of the United States, residing at Uniontown, in the county of Fayette and State of Pennsylvania, have invented a new and useful Flexible Nut, of which the following is a specification.

This invention relates to a flexible nut adapted to be used in coke drawing machine, used for pulling coke out of bee-hive ovens, or in any other machine wherein a swinging member is actuated by means of a screw, which engages a nut pivotally carrier by the swinging member.

With devices of this character as heretofore constructed, the nut is provided with two lugs one on each side, which are mounted in rigid bearings on the swinging head, and as a consequence the vibration and tilting of the swinging head and carriage causes the lugs to break off, sometimes as often as three times in one day. The screw is frequently bent, and this delays the operation of the plant until repairs are made, which are often quite costly.

The object of the present invention is to provide a nut which is constructed so that it may be flexibly held, allowing sufficient play to permit a smooth operation of the machine, and formed in such a manner that breakage seldom if ever occurs.

The preferred form of the invention is illustrated in the accompanying drawing, in which Figure 1 is a plan view of the bed plate and ram carriage of a coke drawing machine in which the invention is used.

Figure 2 is a side elevation of the carriage and ram.

Figure 3 is a vertical sectional view through the invention taken transversely of the screw.

Figure 4 is a vertical sectional view taken longitudinally of the screw.

The invention, as herein shown, is used in connection with a coke drawing machine, comprising a bed plate 5 on which a ram carriage 6 is mounted for swinging movement about a shaft 7 as a center. The carriage is supported in the usual manner by circular tracks 8, and a ram 9 provided at its end with a scoop 10 is mounted for longitudinal sliding movement on the carriage 6.

The swinging movement of the carriage 6 is effected through the rotation of a screw 11, which is in threaded engagement with a spherical nut 12, which is held between a spherical recess 13 in the carriage 6 and a similar opposed recess 14 in a cap 15, which is connected to the carriage 6 by means of screws 16 or the like. The nut 12 is preferably cored out, and then lined with babbitt, as indicated at 17, by pouring on a threaded mandrel. The nut 12 is mounted for universal movement within the recesses 13 and 15, but is held against rotation with the screw 11 by means of a dial pin 18, which is threaded through the cap 15 in a direction substantially perpendicular to the plane of movement of the carriage 6, and perpendicular to the screw 11. The inner end of the pin 18 engages a recess 19 in the nut 12, and the pin may be adjusted longitudinally and held in its adjusted position by means of a lock nut 20. The recess 19 is preferably elongated somewhat in the longitudinal direction of the screw 11, as shown in Figure 4, so as to allow for a limited amount of vibration or tilting of the carriage 6.

It is to be observed that the nut 12 is freely rotatable in the plane of the swinging movement of the carriage 6, about an axis which is in alinement with the pin 18. The nut, however, has no projecting parts. Allowance is made for vibration of the carriage, and even in case of the unprecedented breakage of the pin 18, the nut will still be held within the recesses 13 and 14, and it will be impossible for the screw 11 to become bent. Thus, the objectionable features of the nuts heretofore used are avoided.

While I have shown and described particularly a nut used in connection with a coke drawing machine it is obvious that the same style of nut may be used in any machine, wherein a swinging member is actuated by means of a screw in a similar manner. The size and proportion of the parts and the relative arrangement of the different elements may also be modified without departing from the salient features of the invention. It is, therefore, my intention to cover all such modifications and variations by the appended claims.

What is claimed is:

1. In a device of the character described, the combination of an oscillatory member having a ball and socket bearing at one side of its center of oscillation, a screw disposed in the plane of oscillation and in threaded engagement with the ball, and a pin secured in a position substantially perpendicular to the plane of oscillation and substantially perpendicular to said screw, said ball having a recess with which said pin engages to prevent the ball from rotating when the screw is rotated.

2. In a device of the character described, the combination of a member mounted for oscillation, and having at one side of its center of oscillation a bearing with opposed spherical bearing surfaces, a ball mounted between said surfaces and having a diametric threaded bore, a screw disposed in the plane of oscillation and in engagement with said bore, a pin secured in the bearing in a line substantially perpendicular to the plane of oscillation, said ball having a recess with which said pin engages to prevent the ball from rotating when the screw is rotated.

3. In a device of the charcater described, the combination of a member mounted for swinging movement and having a ball and socket bearing at one side of its center, a screw disposed in the plane of movement of said member and in threaded engagement with the ball, and a pin secured in the bearing in a position substantially perpendicular to the plane of movement of said member, and substantially perpendicular to said screw, said pin being adjustable longitudinally, said ball having a recess with which the pin engages to prevent the ball from rotating when the screw is rotated, said recess being elongated in the direction of the longitudinal axis of the screw to permit a limited vibratory movement of the swinging member with respect to the screw.

4. In a device of the character described, the combination of an oscillatory member having a ball and socket bearing at one side of its center of oscillation, a screw disposed in the plane of oscillation and in threaded engagement with the ball, and a pin secured in a position substantially perpendicular to the plane of oscillation and substantially perpendicular to said screw, said ball having a recess with which said pin engages to prevent the ball from rotating when the screw is rotated, said recess being elongated to permit a limited vibratory movement of said member with respect to the screw.

In testimony that I claim the foregoing as my own I have hereto affixed my signature.

SAMUEL W. WARMAN.